Sept. 17, 1946.　　　F. C. MELCHIOR　　　2,407,719
CARBURETOR PRE-HEAT SYSTEM
Filed Feb. 1, 1944　　　3 Sheets-Sheet 1

INVENTOR.
Frederick C. Melchior

Sept. 17, 1946. F. C. MELCHIOR 2,407,719
CARBURETOR PRE-HEAT SYSTEM
Filed Feb. 1, 1944 3 Sheets-Sheet 2

INVENTOR.
Frederick C. Melchior

Sept. 17, 1946.   F. C. MELCHIOR   2,407,719
CARBURETOR PRE-HEAT SYSTEM
Filed Feb. 1, 1944   3 Sheets-Sheet 3

INVENTOR.
Frederick C. Melchior
BY
Attorneys

Patented Sept. 17, 1946

2,407,719

UNITED STATES PATENT OFFICE 2,407,719

CARBURETOR PREHEAT SYSTEM

Frederick C. Melchior, New York, N. Y.

Application February 1, 1944, Serial No. 520,629

3 Claims. (Cl. 123—171)

This invention relates to improvements in aircraft power plant installations and more particularly to the use and disposal of engine exhaust heat and of the air heated in the process of cooling the engine and its cylinders.

More specifically my invention provides an improved carburetor air pre-heat system combining the cooling of the exhaust collector ring with the ventilation of the engine compartment and collector well.

In the conventional air-cooled engine installation the nose cowl is equipped with a series of cowl flaps attached to its trailing edge and extending substantially along the periphery thereof except for the areas occupied by the air intake scoops for the carburetor and for oil cooling. When the cowl flaps are opened at an angle the deflection of the air flow causes suction out of the engine compartment thereby augmenting ventilation of the same. However, cowl flaps when opened have the undesirable effect of causing turbulence disturbing the air flow around the nacelle and part of the wing and sometimes adversely affecting the control surfaces to the extent that in some current aircraft cowl flaps cannot be opened appreciably during flight.

To provide adequate pre-heating of the carburetor air as an anti-icing measure, the conventional installation also embodies a shroud or muff, comprising in effect a continuation of the rear cowl, rigidly attached to the latter and partially enclosing the collector well housing the exhaust collector ring or manifold. The shroud or muff is interrupted at the top and bottom of the nacelle to accommodate air scoops to the carburetor and oil cooler.

It is usual to locate over the collector well an alternate air valve which may be adjusted at will to admit the desired amount of hot air from the collector well where it has been heated through contact with the exhaust collector ring. This arrangement provides adequate carburetor air heat to cope with normal icing conditions, which has been found not to be the case in installations lacking such arrangement. However, it does not render optimum ventilation of the engine compartment under all conditions, nor does it provide for the proper cooling of the exhaust collector ring and ventilation of the collector well, especially when carburetor heat is not used, thus causing heat to be trapped which in turn results in undue heating of the accessories compartment as well as thermal punishment of various pertinent parts.

An object of the present invention is to provide means for proper cooling of the exhaust collector ring and ventilation of the collector well, whether or not the carburetor heat is used, and to eliminate the undesirable effects of the cowl flaps now in current use.

The subject invention embodies a sliding Venturi cowl to replace the conventional cowl flaps, said Venturi cowl incorporating rigidly attached thereto a shroud or muff partly enclosing the exhaust collector ring in the well and extending substantially along the periphery. As the muff moves with the sliding Venturi cowl this whole unit forms with the rear cowl and the diaphragm a variable Venturi opening as an exit aperture for the hot air flowing through the exhaust collector well, such flow being augmented by venturi suction.

In the accompanying drawings—

Figure 1:
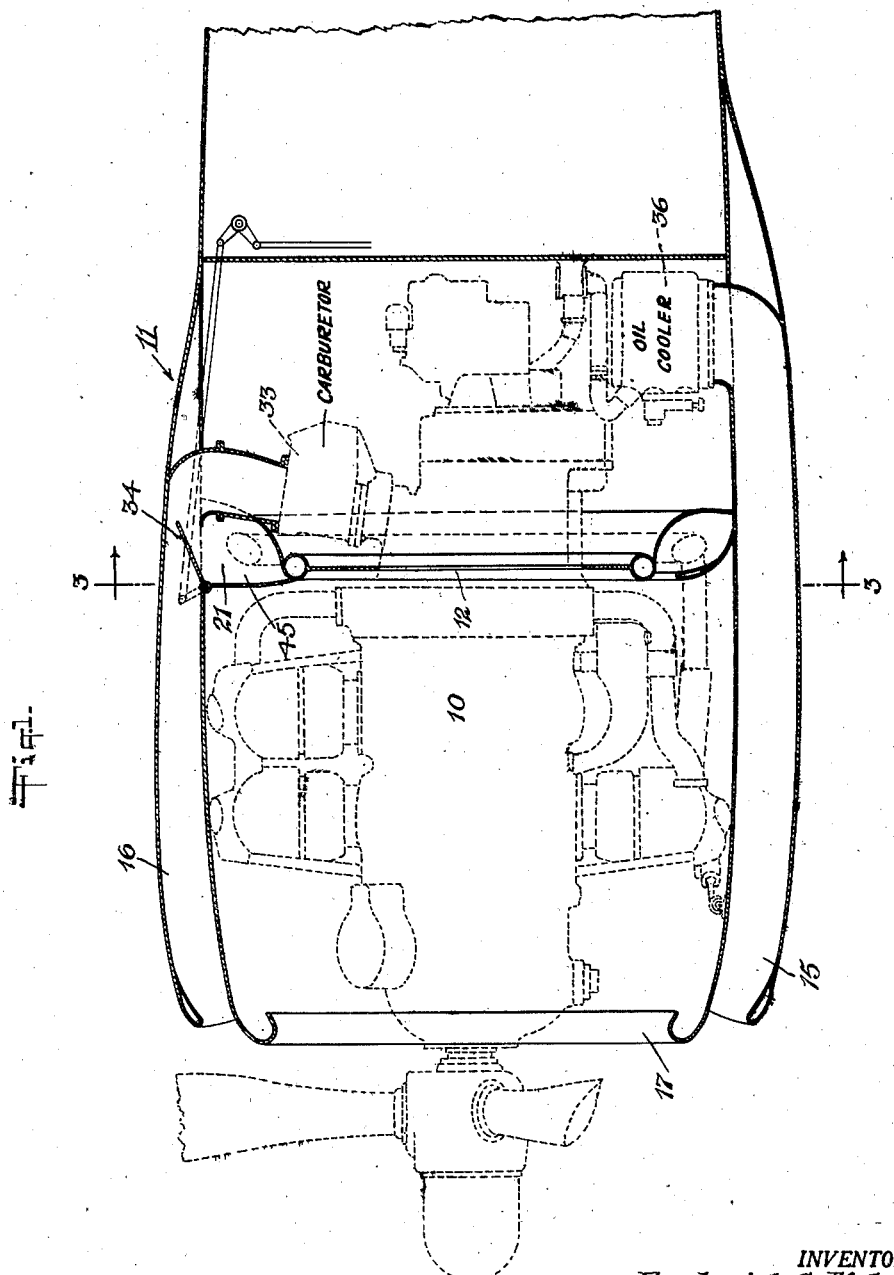
Figure 1 is a vertical sectional view of a nacelle embodying my invention.
Figure 2:
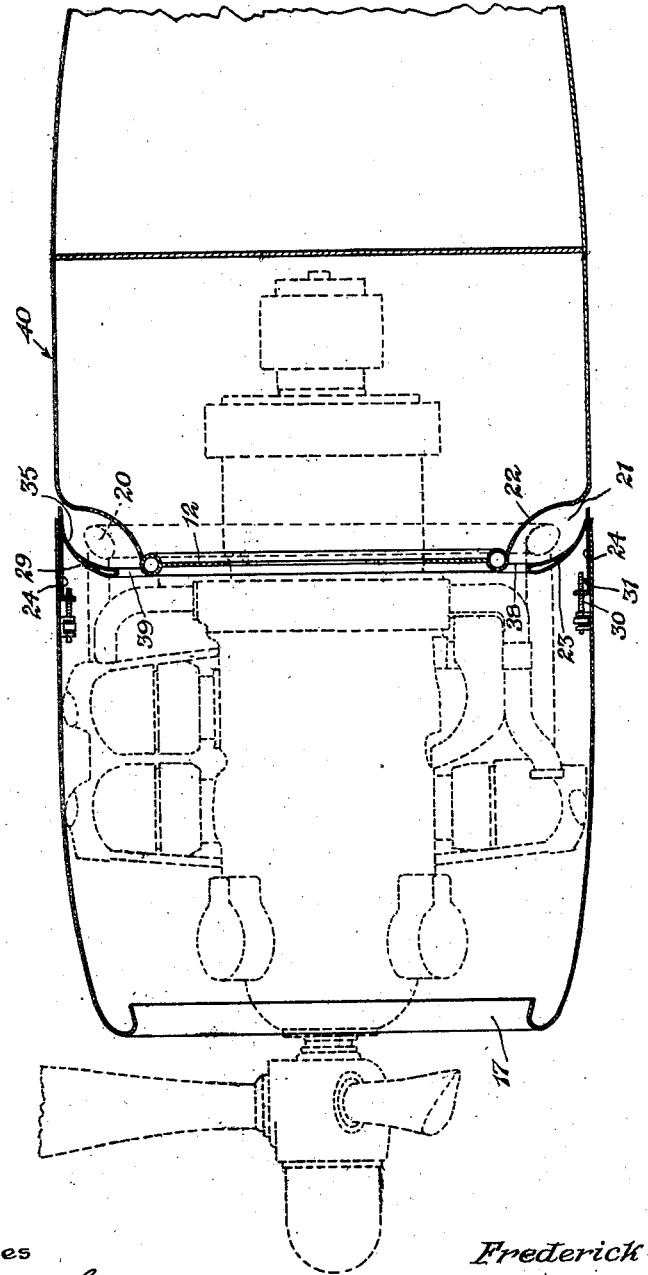
Fig. 2 is a horizontal sectional view.
Figure 3:
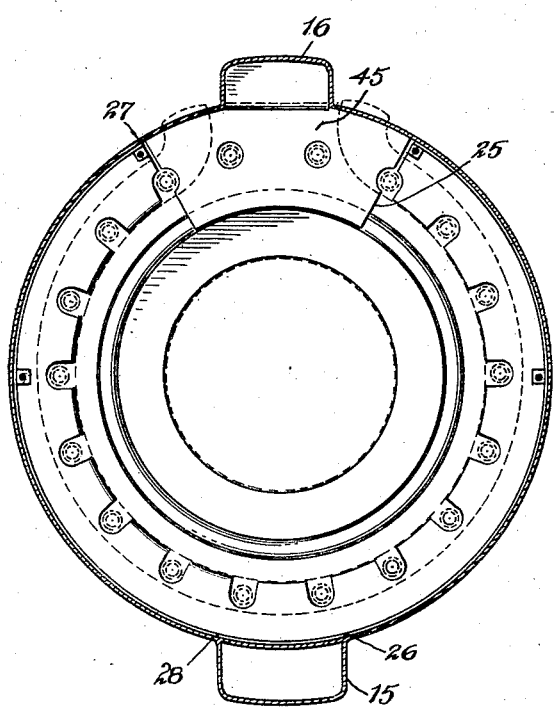
Fig. 3 is a cross sectional view taken on the line 3—3 of Figure 1.

As in the conventional installation the motor 10 is mounted in the nacelle 11 in the usual manner on the conventional mount ring 12. An air intake scoop 15 for the oil cooler may be provided as is the air intake or ram scoop 16 for the carburetor. These are usually mounted with the scoop 15 at the bottom and the scoop 16 at the top of the nose cowl 17. My invention contemplates an engine having a conventional exhaust collector ring 20 and an exhaust collector well 21 formed by a diaphragm 22 and a movable shroud member 23 attached to a sliding Venturi cowl 24. The shroud 23 is so shaped as to form with the diaphragm 22 a collector well substantially elliptical in cross section. A fixed shield 45 separates the upper part of the collector well from the engine compartment, said shield extending over a sector sufficiently large to compel the cooling air to flow substantially along the exhaust collector well before entering the carburetor, when heated air is used in the same.

The Venturi cowl member 24 and the shroud 23 are preferably made in one piece extending from the edge 25 of the shield 45 around to the opposite edge 27. However, if desired, the movable cowl member 24 may extend from the edge 27 of the plate 45 to the edge 28 of the oil cooling scoop 15 and a similar cowl member 35 having a shroud 29 may be mounted on the other side of the nacelle, it being understood that the length of the movable cowl 24 and its shroud 23 need cowl 24 and the shroud 23 may be controlled manually or thermostatically by any suitable means such as the thread bar 30 engaging the bracket 31 so that as the bar 30 is turned the cowl will move accordingly.

Mounted under the ram scoop 16 adjacent to where it enters the engine 33 is an alternate air valve 34 separating the collector well 21 from the ram scoop 16. The valve 34 may be operated in any suitable manner and it may or may not be coordinated with the movement of the Venturi cowl 24 or, where two cowls are used, 24 and 35.

In full cold operation air will be directed through the ram scoop 16 into the carburetor at 33 as in the conventional installation. Additional air will pass through the nose cowl 17 absorbing heat from the motor 10 and cooling the motor and will then pass into the collector well through the opening 38 and 39 formed between the mount ring and the movable shroud 33 thus absorbing heat from and cooling the exhaust collector ring.

In operation the action of the air past the nacelle will create a Venturi suction in the Venturi slot between the sliding cowl 24 and the rear cowl 40 to suck the air over the motor and through the collector well around the exhaust collector ring. With the valve 34 closed the air going to the carburetor will be direct from the outside. The valve may be operated either manually or thermostatically so as to allow a required portion of the heated air from the collector well to mix with the air coming through the scoop 16. Naturally the greater the opening of the valve 34 the more heated air will pass to the carburetor.

By operation of the Venturi cowl 24 the mass flow of air over the cylinders can be effectively controlled. This mass flow being constant for a given set of conditions it is evident that the amount of heated air transmitted to the carburetor will depend upon the ratio of the opening of the Venturi cowl 24 to that of the alternate air valve 34 as heated air can only flow to the carburetor by way of the collector well. It is also evident that the carburetor must first obtain its share of the mass flow of cooling air passing through the engine compartment, the sliding Venturi cowl 24 being open just enough to drain out the remainder, said opening to be governed primarily by desired cylinder head temperatures. It follows that when no hot air is admitted to the carburetor the opening of cowl 24 must be correspondingly greater and, likewise when maximum carburetor heat is needed, the opening of cowl 24 should be barely large enough to maintain cylinder temperatures within permissible limits. By thus properly manipulating the valve 34 and cowl 24 the air going into the carburetor as well as the cylinder temperatures can be effectively controlled.

To further improve the cooling of the exhaust collector the inner edge of the muff or shroud is rounded or shaped in a manner so as to form with the mounting ring and the diaphragm an entrance aperture for the cooling air into the collector well, said aperture being also in the nature of a Venturi slot or opening for the purpose of providing a more uniform and effective air flow about the exhaust collector ring which, it will be noted, is elliptical in cross section for still further improvement or flow around it. Such improved flow renders better heat transfer and consequently a greater degree of pre-heat available.

In addition to the aforementioned undesirable effect of cowl flaps when opened disturbance of the air flow causes a drag which represents a definite loss in terms of horse power. In the subject invention the method of disposing of heat through Venturi action causes no such disturbance with consequent losses. Not only will my construction further control the heat to the carburetor by virtue of increased heat transfer efficiency due to improved air flow through the collector well and around the exhaust collector ring but as a direct consequence is obtained greatly improved cooling of the exhaust collector ring and ventilation of the collector well together with improved ventilation of the engine compartment and cooling of the engine under all conditions of flight.

I claim—

1. In combination with an engine installation including a nacelle having a nose cowl and an air intake scoop leading to the carburetor of said engine and an exhaust collector ring, of a carburetor pre-heat system including a slidable cowl member extending from either side of said air scoop, a diaphragm extending from said engine mounting to the outer edge of said nacelle, a shroud on said slidable cowl forming with said diaphragm a collector well around said exhaust collector ring, a valve leading from said collector well to said air intake scoop, means for selectively operating said valve and said slidable cowl to determine the amount of air passing through said collector well and the amount of air passing from said collector well into said air scoop.

2. In combination with an engine installation including a nacelle having a nose cowl and an air intake scoop leading to the carburetor of said engine, said installation including a conventional mount ring and an exhaust collector ring, adjacent thereto, of a ventilating and carburetor pre-heating system including a diaphragm extending from said mount ring to the outer edge of said nacelle, a slidable cowl member extending from either side of said air scoop, a shroud on said slidable cowl forming with said diaphragm a collector well about said exhaust collector ring, means for moving said slidable cowl and shroud within said nacelle to vary the opening from the interior of said nacelle to the outer air, a valve leading from said collector well to said air intake scoop, and means for operating said valve to control the amount of air passing from said collector well into said air scoop.

3. In combination with an engine installation including a nacelle having a nose cowl and an air intake scoop leading to the carburetor of said engine, said engine installation including a conventional mount ring and an exhaust collector ring, adjacent thereto, of a ventilating and carburetor pre-heating system including a diaphragm extending from said mount ring to the outer edge of said nacelle, a slidable cowl member extending from either side of said air scoop, a shroud on said slidable cowl forming with said diaphragm a collector well around said exhaust collector ring, means for moving said slidable cowl and shroud within said nacelle to vary the opening from the interior of said nacelle to the outer air, a valve leading from said collector well to said air intake scoop, and means for operating said valve to control the amount of air passing from said collector well into said air scoop, said means being operated to prevent any air from said collector well from passing into said air scoop or to mix the heated air with air from said air scoop.

FREDERICK C. MELCHIOR.